United States Patent
Martin

(10) Patent No.: US 7,257,080 B2
(45) Date of Patent: Aug. 14, 2007

(54) DYNAMIC TRAFFIC-BASED PACKET ANALYSIS FOR FLOW CONTROL

(75) Inventor: Gregor J. Martin, Mountain View, CA (US)

(73) Assignee: LSI Corporation, Milpitas, CA (US)

( * ) Notice: Subject to any disclaimer, the term of this patent is extended or adjusted under 35 U.S.C. 154(b) by 1060 days.

(21) Appl. No.: 10/315,506

(22) Filed: Dec. 9, 2002

(65) Prior Publication Data

US 2004/0109411 A1    Jun. 10, 2004

(51) Int. Cl.
H04L 12/56    (2006.01)
H04L 12/26    (2006.01)

(52) U.S. Cl. ..................... 370/230; 370/252

(58) Field of Classification Search ............... 370/229, 370/230, 230.1, 231–236
See application file for complete search history.

(56) References Cited

U.S. PATENT DOCUMENTS 6,252,849 B1 * 6/2001 Rom et al. .................. 370/230

* cited by examiner

Primary Examiner—Chau Nguyen
Assistant Examiner—U-Lun Wang
(74) Attorney, Agent, or Firm—Christopher P. Maiorana, P.C.

(57) ABSTRACT

An apparatus comprising a plurality of first counters, a second counter, and a logic circuit. The plurality of first counters may each be configured to increment a first value in response to receiving one of a plurality of incoming data packets on an associated port. The second counter may be configured to increment a second value in response to a highest value of said first values being incremented. The logic circuit may be configured to generate an output representing a volume of packet traffic in response to the plurality of first values and the second value. The output signal generally indicates which of a plurality of ports is best suited for implementing flow control.

18 Claims, 3 Drawing Sheets

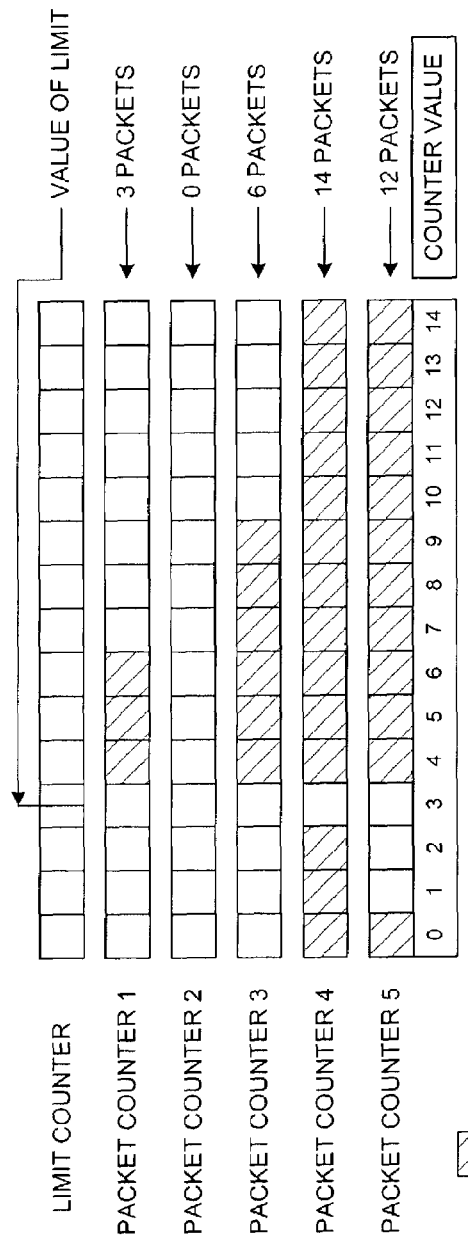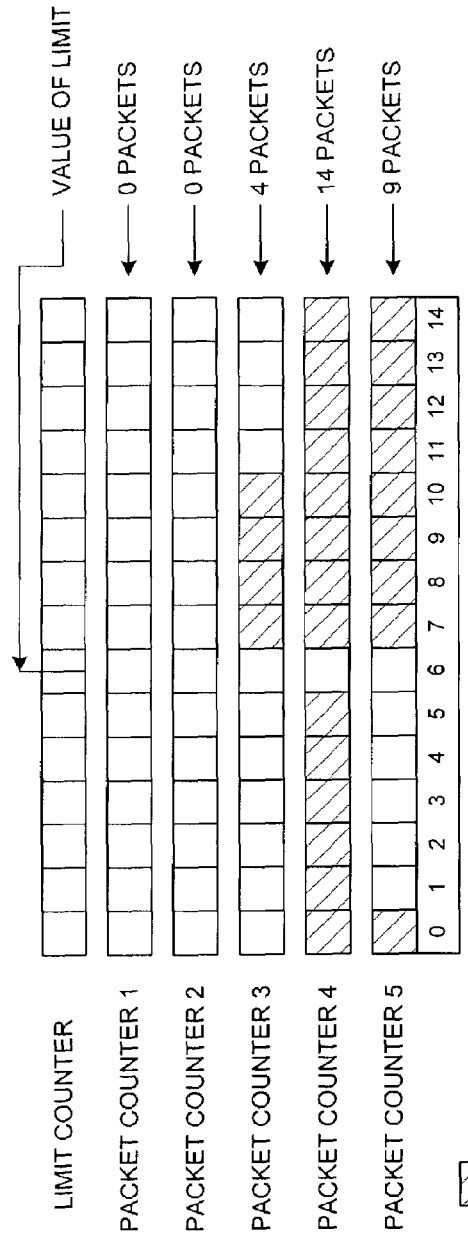

DYNAMIC TRAFFIC-BASED PACKET ANALYSIS FOR FLOW CONTROL

FIELD OF THE INVENTION

The present invention relates to a digital network communications device generally and, more particularly, to a method and/or apparatus for implementing flow control on a particular port of an Ethernet switch.

BACKGROUND OF THE INVENTION

A conventional store and forward switch for a packet switching system (i.e., Ethernet) can only deal with a finite amount of packets over a given time. Since one incoming packet can result in multiple outgoing packets, an overrun case can arise where a packet should be sent out on a selected port but there is no room to queue that packet on the output portion of the selected port. To avoid such an overrun, flow control is implemented. Flow control attempts to reduce the amount of incoming traffic to the output portion of the selected port when the resources in the switch or selected output port become depleted. Flow control is usually implemented on a per-output basis. If one or more input ports has sent a large amount of traffic to the selected output port that has become increasingly full, flow control on the input ports reduces the incoming traffic to the selected output port. Flow control should be minimized on input and output ports that are not resource limited. Flow control should attempt to target only the traffic flow that is likely to cause an overrun.

Conventional flow control approaches do not provide an efficient way to target flow control on only the most suitable port(s). Conventional flow control needs CPU interaction, large counters, and/or other logic.

One conventional approach is to implement flow control on the port from which the next incoming packet is received. The port that sent the particular incoming packet is not necessarily the port that has recently sent a large amount of traffic to the selected output port and, hence, may not be the best port to implement the flow control. Such an approach will implement flow control on all ports still sending traffic to the selected output port. Eventually the best port(s) will be flow controlled, but at the expense of other ports that may be unnecessarily flow controlled. Such unnecessary flow control is undesirable in many situations. Unnecessary flow control of all ports can result in a very inefficient data traffic flow.

A second conventional approach uses counters to keep a record (i) of how many packets have been received and (ii) from which port the packets originated. In some cases each counter can be reset during a read, so only the number of packets received since the last time the port was read needs to be, stored. The CPU can then read each counter in turn and determine which port had sent the most traffic since the last read. The second conventional approach needs either large counters, frequent CPU intervention, or both. In particular, a counter is needed for each possible input and another counter for every output. Each counter is likely to be large (i.e., a 24 port switch will need 23×24=552 counters of this size).

Since counting is generally done over a large time frame, conventional solutions do not necessarily give a good indication on which port most recently sent the most packets to a selected output port. This is a serious disadvantage. Also, conventional solutions are not always accurate since the time between each counter read cannot be fully controlled (i.e., due to interrupts) The count that is read for each port cannot be guaranteed to have been generated over the same time span as the time between each counter read.

It would be desirable to implement a flow control scheme that has the ability to react quickly and implement flow control on an input that has a short burst of traffic without needing CPU interaction, large counters, and/or other logic.

SUMMARY OF THE INVENTION

The present invention concerns an apparatus comprising a plurality of first counters, a second counter, and a logic circuit. The plurality of first counters may each be configured to increment a first value in response to receiving one of a plurality of incoming data packets on an associated port. The second counter may be configured to increment a second value in response to a highest value of said first values being incremented. The logic circuit may be configured to generate an output representing a volume of packet traffic in response to the plurality of first values and the second value. The output signal generally indicates which of a plurality of ports is best suited for implementing flow control.

The objects, features and advantages of the present invention include providing a method and/or apparatus for implementing flow control on a particular port of a switch that may (i) implement counters with unique rule sets that interact with each other to produce a unique, self-adjusting statistics gathering mechanism, (ii) implement a unique method for flow control selection in conjunction with comparison logic in a packet switching environment, (iii) be self-adjusting so that for a given number of packets (e.g., the counter size−1) the input port that has most recently sent the given number of packets can be detected, (iv) implement flow control selection with a small amount of logic, (v) be configurable or extendable in the number of packets to count, (vi) be tailored for a variety of system applications, (vii) need minimal or no CPU interaction, and/or (viii) be completely implemented in hardware.

BRIEF DESCRIPTION OF THE DRAWINGS

These and other objects, features and advantages of the present invention will be apparent from the following detailed description and the appended claims and drawings in which:

FIG. 3 is a diagram illustrating an exemplary operation of the present invention;

FIG. 4 is a diagram further illustrating the exemplary operation of FIG. 3.

DETAILED DESCRIPTION OF THE PREFERRED EMBODIMENTS

The present invention may implement logic to activate flow control on one or more ports based on load conditions. The present invention may also be used to collect statistical traffic information for any type of packet switch (e.g., an Ethernet switch or any other type of packet switch). The present invention may be used to perform dynamic traffic flow analysis with the intention of, but not limited to, instant selection of the optimal port to implement flow control in a packet switch at any given time. The present invention may use data gathered from recent traffic event statistics. The output signal generally indicates which of a plurality of ports is best suited for implementing flow control.

In one example, an implementation of the present invention may be separately applied to each output port and may be concerned with n input ports, where n is an integer. In particular, a decision whether to activate flow control on a particular input port may be determined for each output port of the switch. While a 6-port switch will be described (e.g., n=6) other numbers of ports may be used to meet the design criteria of a particular application.

Generally, in an n port switch, there may be n−1 input ports to count packets for each output port. In the case of a 6-port switch there may be 6 small counters associated with each output port (e.g., 36 counters total). At each output, one counter may be implemented for each valid input to that port. In this case of a 6 port switch there are 5 valid inputs as packets are never transmitted out on the same port as they were received. A single shared limit counter may be implemented as the sixth counter. One counter may be implemented for each input port. A single shared limit counter may be implemented as one of the six counters for each output port. Hence, there may only be 5 input ports to count packets from for a particular output port. The limit counter may be used in conjunction with the packet counters to keep track of which port has most recently sent the most packets. The present invention may implement flow control on the port that has most recently sent the most packets. The limit counter may effectively act as the end or limit of the period over which the traffic flow is averaged. Each of the 5 packet counters may count incoming packets from the 5 other ports (e.g., each counter may be responsible for recording every packet received from a specific port).

Figure 1:
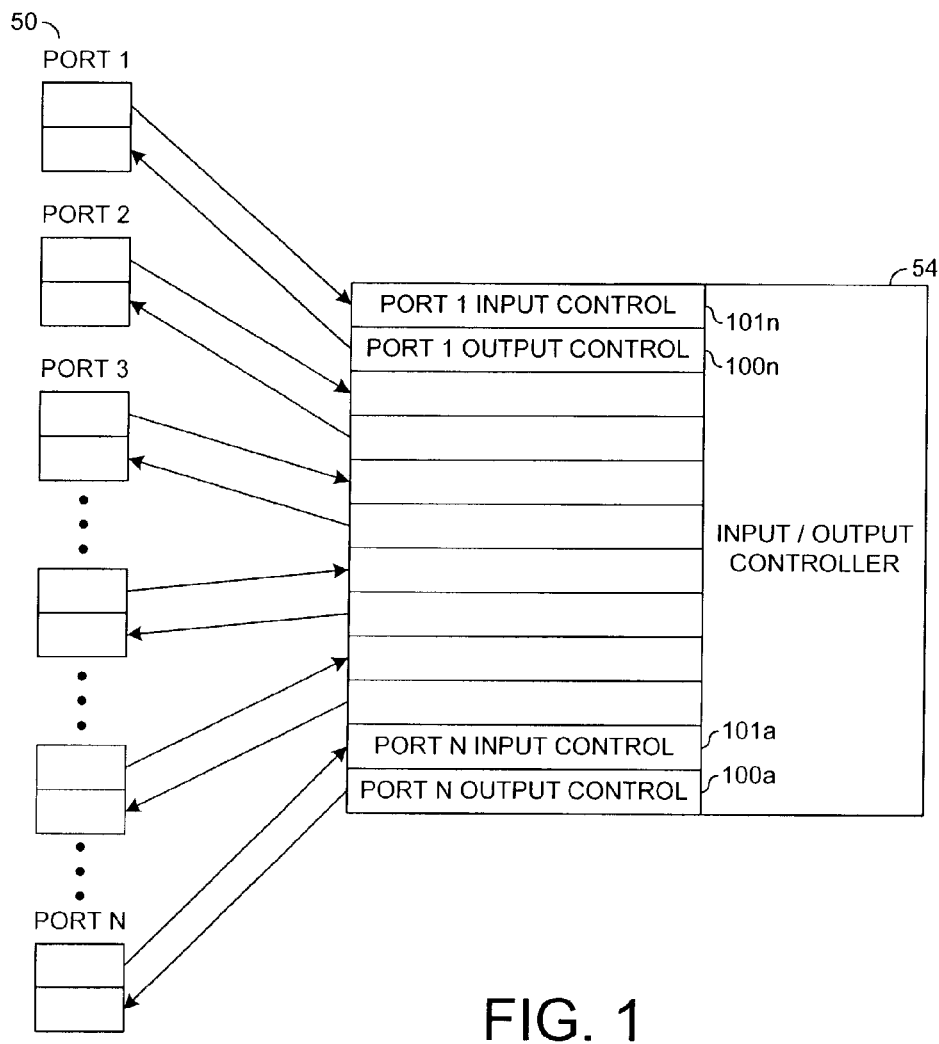
FIG. 1 is a block diagram of a network switch or hub circuit illustrating a context of the present invention.

Referring to FIG. 1, a block diagram of a circuit (or system) 50 is shown illustrating the context of the present invention. In one example, the circuit 50 may be an n port Ethernet switch or hub. The Ethernet switch 50 generally comprises a number of ports PORT1-PORTn and a control circuit 54. The control circuit 54 may be an input/output controller that controls the traffic flow among the ports PORT1-PORTn. The input/output controller 54 generally comprises a number of output control sections 100a-n and a number of input control sections 101a-n each corresponding to one of the ports PORT1-PORTn. The present invention concerns the output control sections 100a-n.

Figure 2:
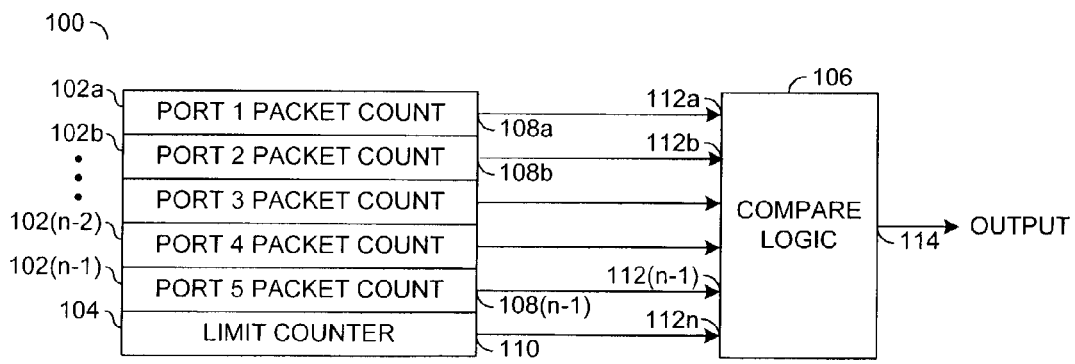
FIG. 2 is a diagram illustrating a preferred embodiment of the present invention.

Referring to FIG. 2, a diagram is shown illustrating a system (or circuit) 100 (e.g., one of the output control sections 100a-n) in accordance with a preferred embodiment of the present invention. The system 100 generally comprises a number of input port packet counters 102a-(n-1), a limit counter 104 and a compare logic circuit 106. The limit counter 104 is generally shared between the packet counters 102a-(n-1). The limit counter 104 and the packet counters 102a-(n-1) may be implemented on each of the ports PORT1-PORTn. The counter 104 and the packet counters 102a-(n-1) may be implemented to have a linked behavior.

Each of the packet counters 102a-(n-1) may have an associated output 108a-(n-1) The limit counter 104 may have an output 110. The outputs 108a-(n-1) may present the contents (e.g., an internal value) of the packet counters 102a-(n-1) to one or more inputs 112a-(n-1) of the compare logic circuit 106. The output 110 may present the contents (e.g., an internal value) of the limit counter 104 to an input 112n of the compare logic circuit 106. The compare logic circuit 106 may generate a signal (e.g., OUTPUT) presented at the output 114 in response to information received at the inputs 112a-n. The signal OUTPUT may be used by the controller 54 to implement flow control on the appropriate inputs of the ports PORT1-PORTn. In particular, the signal OUTPUT may indicate which of the ports PORT1-PORTn is best suited for flow control. The signal OUTPUT normally indicates one of the ports PORT1-PORTn, even when flow control is not currently active. By driving the signal OUTPUT at all times, once flow control is necessary, the flow control mechanism can quickly be activated on an appropriate one of the ports PORT1-PORTn.

Over a given time (e.g., which may be variable but proportional to the activity of the most active port), the most recently active input portions of one of the ports PORT1-PORTn may be determined. The best time to use may be the period immediately preceding the current time. The packet counters 102a-(n-1) may count the activity from each of the ports PORT1-PORTn cycling back to zero when a maximum value is reached. The limit counter 104 may be used to delimit the period over which the counting of the counters 102a-(n-1) is performed. The limit counter 104 may effectively record the back of the time window that is being used. Using the limit counter 104, in conjunction with the packet counters 102a-(n-1), may allow the average of each packet count (e.g., the value in one of the counters 102a-(n-1)) over a time delta to be calculated.

In one example, a packet may arrive at PORT1. This packet may be considered as relevant (e.g., recent) until one of the other ports PORT1-PORTn has transmitted a number of packets that renders the packet arrival at PORT1 as no longer relevant. At this point the packet arrival at PORT1 may be discounted, as are other packet arrivals that arrived at around the same time. These packets arrivals may have occurred long enough in the past for them to be considered as irrelevant for calculating current traffic flow statistics.

The present example may focus on the packet flow during the time delta, from the present time back to a previous time. The time delta may be a linear function of the packet rate from the most active of the ports PORT1-PORTn in terms of Pmax, where Pmax is the number of packets over which the average is being calculated. The relevance of the traffic figures may always be kept as a proportion of the ongoing traffic profile by being a function of packet rate, and not a fixed time.

The packet counters 102a-(n-1) and the limit counter 104 may have a fixed set of operational rules implemented to achieve the described function. The packet counters 102a-(n-1) may be set to wrap around at a value less than the maximum counter size. The counters 102a-(n-1) may be implemented with maximum count values greater than the highest anticipated values needed. After production, the counters 102a-(n-1) may be programmed to wrap around at a lower count value, effectively reducing the number of packets in the count cycle. Examples of such rules may include:

1. All counters may wrap around from the maximum value to 0.
2. The limit counter 104 may remain one location (or count value) in front of the leading packet counter (e.g., one of the packet counters 102a-(n-1) having the highest count value). When the leading packet counter is one location behind the limit counter 104 and another packet is recorded on the leading packet counter, generally both the packet counter and the limit counter 104 are incremented.
3. When the limit counter 104 catches up with a non-active packet counter (e.g., the packet counter of one of the ports PORT1-PORTn that has not sent packets recently), the value of the non-active packet counter may be incremented with the limit counter 104 regardless of whether a packet is received on the non-sending port or not.

Using these rules, the locations of the packet counters 102a-(n-1) may be compared with respect to the limit counter 104. The number of packets that have been received from each of the port PORT1-PORTn during the relevant time delta may be calculated. The time delta may be a function of the packet rate of the most active port, rather than a fixed period of time.

Using these simple rules, at any given time a determination of which of ports PORT1-PORTn have sent the most recent X packets may be made, where X is 1-counter size. As traffic continues to be recorded, older traffic may no longer be a part of the count due to the advancement of the limit counter 104.

In another example, when the compare logic 106 is initialized, the port packet counters 102a-(n-1) and the limit counter 104 should all have a value of zero. As packets arrive, the respective port packet counters 102a-(n-1) and the limit counter 104 may be incremented. Eventually one of the packet counters 102a-(n-1) (e.g., a leading counter) should reach the second from maximum value before a wrap around. At this point, considering the leading of the counters 102a-(n-1) may have a continuous or cyclic property, the leading of the counters 102a-(n-1) may be one location from reaching the value in the limit counter 104. When the leading of the packet counters 102a-(n-1) is incremented from a current location (e.g., one location behind the limit counter 104), the limit counter 104 may be also be incremented. From this point onward, the leading of the packet counters 102a-(n-1) may push the limit counter 104 to wrap around. If the leading of the packet counters 102a-(n-1) then starts to increment at a slower rate, indicating less traffic on that port, a second of the counters 102a-(n-1) may overtake the leading of the counters 102a-(n-1). At this point the second of the counters 102a-(n-1) may start to push the limit counter 104 to wrap around. There are generally one or more of the packet counters 102a-(n-1) pushing the limit counter 104 forward. The particular one or more of the counters 102a-(n-1) that pushes the limit counter 104 forward the most are the "most active recently" of the counters 102a-(n-1). The particular ports PORT1-PORTn associated with the "most active recently" counter(s) of the counters 102a-(n-1) are generally the most effective of the ports PORT1-PORTn to implement flow control.

By analyzing the position (or pointers) of the limit counter 104 and the position (or pointers) of the packet counters 102a-(n-1), the circuit 100 may discern how many packets have been sent from each of the ports PORT1-PORTn during the time specified by the time delay value. The analysis performed by the circuit 100 may be done in hardware or software.

Referring to FIG. 3 and FIG. 4, two diagrams are shown illustrating another example of the present invention. In this simplified case, the packet counter 4 (e.g., the packet counter 102(n-2)) may have sent the most traffic recently. Hence, the packet counter 4 may be forcing the limit counter 104 to wrap around. As the limit counter 104 wraps around, the number of packets indicated by all of the packet counters 102a-(n-1) may effectively decrease as the distance between the pointers of packet counters 102a-(n-1) and the pointer of the limit counter 104 decreases.

In FIG. 3, packet counter 1 has recorded 3 packets arriving (illustrated as the shaded portions 4-6 in the second row), the packet counter 2 has recorded no packets (no shaded portions in the third row), the packet counter 3 has recorded 6 packets arriving (illustrated as the shaded portions 4-9 in the fourth row), the packet counter 4 has recorded 14 packets arriving (illustrated as the shaded portions 0-2 and 4-14 in the fifth row) and the packet counter 5 has recorded 12 packets arriving (illustrated as the portions 0 and 4-14 in the sixth row). In one example, if 3 more packets arrive from input port 4, and one from input port 3, the packet count statistics may change, as shown in FIG. 4.

The result may be that packet counter 1 and packet counter 2 are effectively showing no packets. Packet counter 3 may have a count of 4 (e.g., 6−3+1=4) and the packet counter 5 may have a count of 9. The packet counter 4 may have a count of 14 (e.g., the maximum allowed volume of the present example) and may force the limit counter 104 to wrap around. Hence, if flow control is needed, then PORT 4 would be flow controlled.

For the flow control application, a simple hardware compare of each of the packet counters 102a-(n-1) in relation to the limit counter 104 may yield which of the counters 102a-(n-1) is full. Thus, the particular port PORT1-PORTn with the full packet counter 102a-(n-1) may be the best port to implement flow control. By implementing a specific counter size for a particular system, the effectiveness of the flow control selection may be maximized. This may offer great gains in efficiency for Ethernet switches and any other packet switching system where "most recent" traffic flow analysis is beneficial.

Figure 5:
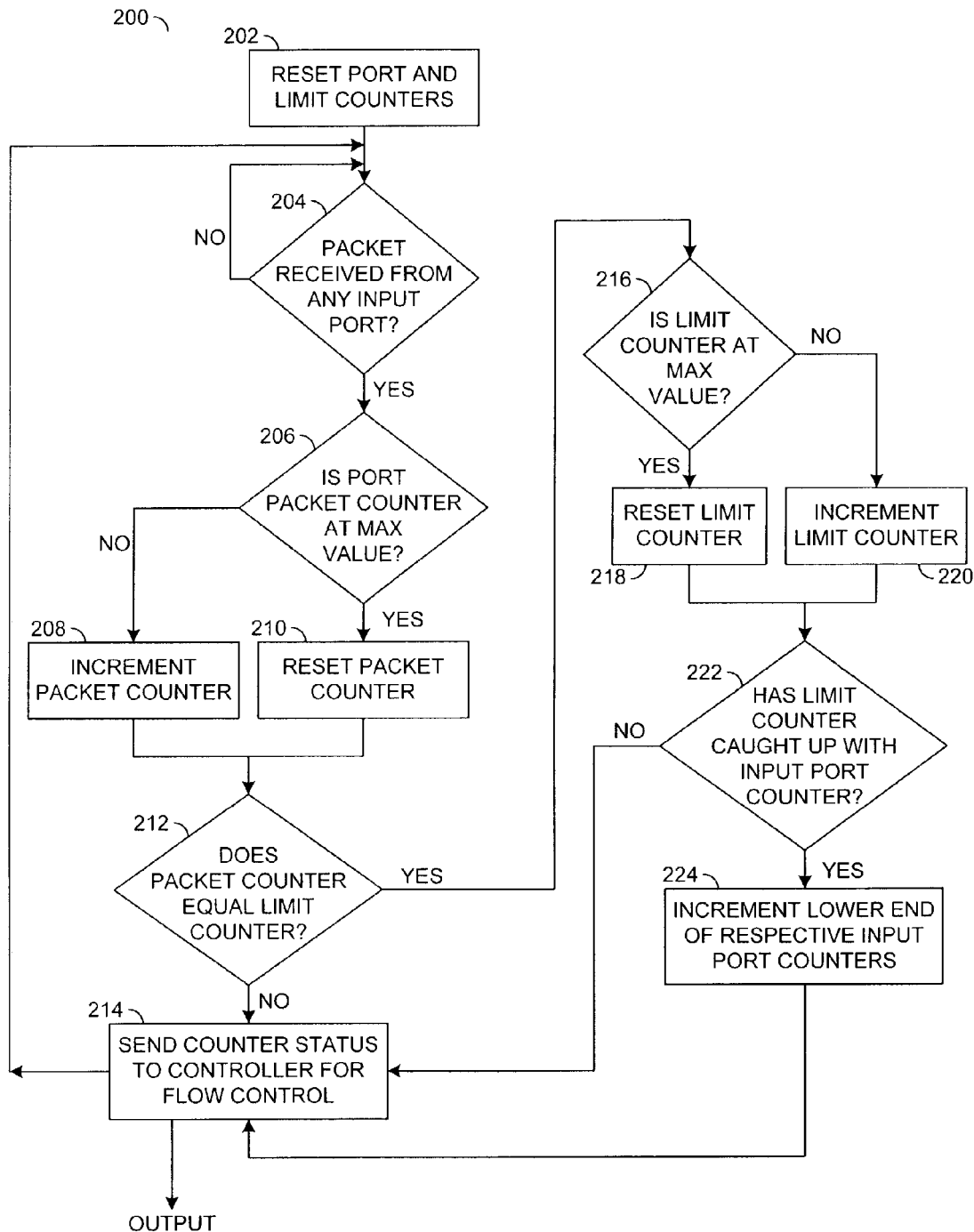
FIG. 5 is a flow diagram illustrating a process in accordance with the present invention.

Referring to FIG. 5, a flow diagram is shown illustrating a process (or method) 200 in accordance with the present invention. The process 200 generally comprises an initial state 202, a decision state 204, a decision state 206, a state 208, a state 210, a decision state 212, a state 214, a decision state 216, a state 218, a state 220, a decision state 222, and a state 224. The process 200 may be used to implement the compare logic 106. If limit counter 104 has caught up with a particular one of the input packet counters 102a-(n-1), then the particular input packet counter 102n-(n-1) must normally be incremented, or if the particular input packet counter 102n-(n-1) is at a maximum value, set to 0, as with the other wrapping counter rules. In the case where the wrap around may be configured to occur at less than the maximum counter value, the wrap around can be implemented as either having a max_value on which to wrap, or instead to simply wrap each of the counters 102n-(n-1) to a value grater than 0 (i.e., each counter may start from and wrap to any number above 0, thus effectively reducing the number of packets over which the count is occurring).

While in the initial state 202, the process 200 may be initialized and the port counters 102a-(n-1) and the limit counter 104 may be reset. The method 200 then moves to the decision state 204. While in the decision state 204, the output port may wait for a packet to be received from any of the input ports PORT1-PORTn. Once a packet is received from one of the input ports PORT1-PORTn, the decision state 206 generally checks to see if the associated port packet counter 102a-(n-1) is at the maximum value. If the associated packet counter 102a-(n-1) is at the maximum value, the state 210 generally resets the packet counter 102a-(n-1) to the first location. If the packet counter 102a-(n-1) is not at the maximum value, the state 208 generally increments the packet counter 102a-(n-1) by a value of one. Next, the decision state 212 checks to see if the limit counter 104 equals the newly incremented counter value. If the limit counter 104 does not equal the newly incremented counter value, the method 200 ends at the state 214. The state 214 generally sends the status of the packet counters 102a-(n-1) and the limit counter 104 to the compare logic 106 and the controller 54 for a flow control decision. The method 200 may repeat beginning at the state 204.

If the limit counter 104 equals the newly incremented packet counter value, the decision state 216 may check to see if the limit counter 104 has reached the maximum value. If the limit counter 104 has reached the maximum value, the state 218 may reset the limit counter 104. If the limit counter 104 has not reached the maximum value, the state 220 may increment the limit counter 104 by a value of one. Next, the decision state 222 may check to see if the limit counter 104 has caught up with any of the input port packet counters 102a-(n-1). If the limit counter 104 has not caught up with any of the input port packet counters 102a-(n-1), the method moves to the state 214. If the limit counter 104 has caught up with some of the input port packet counters 102a-(n-1), the relevant of the packet counters 102a-(n-1) may be incremented by a value of one at the lower end and the method 200 moves to the state 214. The lower end will eventually need to wrap around. The state 224 generally either (i) increments the lower end if the relevant of packet counters 102a-(n-1) is not at a maximum value or (ii) reset if the relevant of the counters 102a-(n-1) is at a maximum value. The method 200 may repeat beginning at the state 204. In general, the various operations in the process 200 may occur mostly, or all, in parallel.

In one example, the limit counter 104 and the packet counters 102a-(n-1) may be implemented as binary counters. With an 8-bit counter, $2^8$, or 256 packets may be counted. However, the limit counter 104 and the packet counters 102a-(n-1) may be modified to meet the design criteria of a particular application.

The present invention may be used for any packet switching system where statistics on the "most recent" packet activity are useful. The present invention may also be used with other existing flow control selection methods to provide a more accurate traffic profile and an improved selection process.

The statistics from each of the ports PORT1-PORTn may also be added together to allow the flow control decision to be based not only on the resource bound output, but also the traffic profile of the other ports PORT1-PORTn. In one example, 2 ports may be sending an equal amount of traffic to a particular port PORT1-PORTn and one port may need to be-flow controlled. Traffic may be arriving at the resource bound one of the ports PORT1-PORTn alone, whereas the other ports PORT1-PORTn may be sending traffic to several other ports PORT1-PORTn, which are not resource bound. In such a case it may be more efficient to implement flow control on the input of one of the ports PORT1-PORTn that is only sending to the single resource bound output port PORT1-PORTn, since less disruptions may occur on the other ports PORT1-PORTn, which are not resource bound.

The function performed by the flow diagram of FIG. 5 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICS, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMS, RAMs, EPROMs, EEPROMS, Flash memory, magnetic or optical cards, or any type of media suitable for storing electronic instructions.

The present invention has been described in the context of a 6 port Ethernet switch or hub. However, other digital networking or packet switching devices may be designed to incorporate the present invention according to the design criteria of a particular implementation.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a plurality of first counters each configured to increment a first value in response to receiving one of a plurality of incoming data packets on an associated port of a plurality of ports;
   a second counter configured to increment a second value in response to a highest value of said first values being incremented; and
   a logic circuit configured to generate an output signal representing a volume of packet traffic in response to said plurality of first values and said second value, wherein said output signal indicates which of said plurality of ports is best suited for implementing flow control.

2. The apparatus according to claim 1, wherein said plurality of first counters comprise input port packet counters.

3. The apparatus according to claim 1, wherein said second counter comprises a limit counter.

4. The apparatus according to claim 1, wherein said ports comprise packet switching ports, wherein said apparatus is implemented for each of said ports.

5. The apparatus according to claim 1, further comprising:
   a control circuit configured to implement flow control on one or more of said ports in response to said output signals.

6. The apparatus according to claim 1, wherein said plurality of first counters and said second counter are implemented as wrap around counters.

7. The apparatus according to claim 6, wherein said second value remains one location in front of a said highest of said first counters.

8. The apparatus according to claim 7, wherein a selected one of said plurality of first values is incremented with said second value when said second value catches up with said selected first value.

9. The apparatus according to claim 1, wherein said apparatus implements dynamic traffic-based analysis to implement flow control on said incoming data packets on one or more of said plurality of ports.

10. The apparatus according to claim 1, wherein flow control is implemented on an input of one of said plurality of ports that has most recently sent the most of said incoming data packets to an output of one of said plurality of ports over a given time span.

11. The apparatus according to claim 1, wherein said logic circuit comprises a compare logic circuit.

12. An apparatus comprising:
  means for incrementing a first value in a plurality of first counters in response to receiving one of a plurality of incoming data packets on an associated port of a plurality of ports;
  means for incrementing a second value of a second counter in response to a highest value of said first values being incremented; and
  means for generating an output signal representing a volume of packet traffic in response to said plurality of first counters and said second counter.

13. A method of implementing flow control on one of a plurality of digital packet switching input ports, comprising the steps of:
  A) resetting a plurality of first counters and a second counter;
  B) incrementing a selected one of said plurality of first counters in response to a received data packet if said selected first counter is not at a predetermined maximum value;
  (C) incrementing said second counter if said second counter eauals said value of said selected first counter and said second counter is not at said predetermined maximum value;
  (D) resetting said selected first counter in response to said received data packet if said selected first counter is at said predetermined maximum value; and
  (E) sending the status of said second counter and said plurality of first counters to a controller if said second counter does not equal a value of said selected first counter, wherein said status is used to indicate which of a plurality of ports is best suited for implementing flow control.

14. The method according to claim 13, further comprising the step of:
  resetting said second counter if said second counter equals said value of said selected first counter and said second counter is at said predetermined maximum value.

15. The method according to claim 13, further comprising the step of:
  sending the status of said second counter and said plurality of first counters to said controller if said second counter has not caught up with a second selected one of said plurality of first counters.

16. The method according to claim 15, further comprising the step of:
  incrementing a lower end of said second selected first counter if said second counter has caught up with said second selected first counter.

17. The method according to claim 16, further comprising the step of:
  sending the status of said second counter and said plurality of first counters to said controller to decide which of said digital packet switching input ports to implement flow control.

18. The method according to claim 13, wherein said plurality of first and second counters comprise Ethernet input port receive data packet counters.

* * * * *